(12) United States Patent
Masuda

(10) Patent No.: US 9,316,897 B2
(45) Date of Patent: Apr. 19, 2016

(54) LIGHT SOURCE UNIT AND PROJECTOR

(75) Inventor: Hiroki Masuda, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 276 days.

(21) Appl. No.: 13/312,312

(22) Filed: Dec. 6, 2011

(65) Prior Publication Data
US 2012/0140185 A1 Jun. 7, 2012

(30) Foreign Application Priority Data

Dec. 7, 2010 (JP) ................. 2010-272414

(51) Int. Cl.
G03B 21/26 (2006.01)
G03B 21/20 (2006.01)

(52) U.S. Cl.
CPC .......... *G03B 21/204* (2013.01); *G03B 21/2093* (2013.01)

(58) Field of Classification Search
CPC ......... G03B 21/16; G03B 21/14; F21V 29/00
USPC ................. 353/95, 94; 348/743; 362/240
See application file for complete search history.

(56) References Cited

U.S. PATENT DOCUMENTS

| 8,096,662 | B2 | 1/2012 | Suzuki | |
| 2003/0231260 | A1* | 12/2003 | Pate et al. | 348/744 |
| 2005/0007563 | A1* | 1/2005 | Yamazaki et al. | 353/98 |
| 2008/0278693 | A1* | 11/2008 | Sawai | 353/38 |
| 2009/0160344 | A1* | 6/2009 | Hsu et al. | 315/117 |
| 2009/0185140 | A1* | 7/2009 | Chen et al. | 353/31 |
| 2010/0245777 | A1* | 9/2010 | Ogura | 353/38 |
| 2011/0037953 | A1* | 2/2011 | Nizani et al. | 353/38 |

FOREIGN PATENT DOCUMENTS

| JP | 2004-341105 | A | 12/2004 | |
| JP | 2005-316441 | | * 11/2005 | ............. G03B 21/16 |
| JP | 2005-316441 | A | 11/2005 | |
| JP | 2006-269078 | A | 10/2006 | |
| JP | 2006-302582 | | * 11/2006 | ............. G02F 1/133 |

(Continued)

OTHER PUBLICATIONS

Translation of 2005-316441.*

(Continued)

*Primary Examiner* — William C Dowling
*Assistant Examiner* — Jerry Brooks
(74) *Attorney, Agent, or Firm* — Holtz, Holtz & Volek PC

(57) ABSTRACT

A projector is provided which includes a light source unit which can reduce the numbers of lenses and mirrors and which can control quantity of light of each color.

A light source unit of the invention includes a laser light source unit 70 which has a plurality of red laser elements 71R and a plurality of blue laser elements 71B as two types of laser emitting elements 71 which emit light of wavelength bands which are different from each other and in which the pluralities of red and blue laser emitting elements 71R, 71B are arranged in a planar fashion, a diffusing unit which is disposed on an optical path of light emitted from the laser light source unit 70 to diffuse the light emitted from the laser light source unit 70, and a light source control unit for controlling the illumination of the laser emitting elements 71R, 71B.

8 Claims, 10 Drawing Sheets

(56) References Cited

FOREIGN PATENT DOCUMENTS

| JP | 2006-302582 A | 11/2006 | |
| JP | 2007-329053 A | 12/2007 | |
| JP | 2008-145510 A | 6/2008 | |
| JP | 2009283214 A | * 12/2009 | ............ F21Y 101/02 |
| JP | 2010-218840 A | 9/2010 | |
| JP | 2010-225392 A | 10/2010 | |

OTHER PUBLICATIONS

Translation of 2006-302582.*
Translation of JP 2009283214 A.*
Japanese Office Action dated Jan. 24, 2013 (and English translation thereof) in counterpart Japanese Application No. 2010-272414.

* cited by examiner

LIGHT SOURCE UNIT AND PROJECTOR

CROSS-REFERENCE TO RELATED APPLICATIONS

This application is based upon and claims the benefit of priority under 35 USC 119 of Japanese Patent Application No. 2010-272414 filed on Dec. 7, 2010, the entire disclosure of which, including the description, claims, drawings and abstract thereof, is to be incorporated herein by reference.

BACKGROUND OF THE INVENTION

1. Field of the Invention

The present invention relates to a light source unit and a projector.

2. Description of the Related Art

In these days, data projectors are used on many occasions as image projection apparatuses which project images including images of screens of personal computers and video images, as well as images based on image data which is stored in memory cards on to a screen.

Conventionally, the mainstream of these projectors has been those which use a high-intensity discharge lamp as a light source. However, in recent years, there have been made many developments and proposals on projectors which use, as a light source, a light emitting diode (LED), a laser beam emitting device, a device utilizing organic EL technology and a luminescent material.

For example, Japanese Unexamined Patent Publication No. 2004-341105 (JP-A-2004-341105) proposes a light source unit which produces light source light of red, green and blue wavelength bands. In this light source unit, red, green and blue luminescent material layers are provided in an end-to-end fashion on a surface of a luminescent plate made up of a disc having transmissivity, and a dichroic filter which transmits ultraviolet radiation and reflects visible light is disposed on a back side of the luminescent plate. In this construction, by shining ultraviolet light on to the luminescent material layers from the back side of the luminescent plate, light source light of red, green and blue wavelength bands is produced from the light source unit.

In addition, in the previous patent application (Japanese Patent Application No. 2009-155458: not prior art) the applicant of this patent application proposed the light source unit which includes the blue laser emitting element, the red light emitting diode and the luminescent wheel which has the green luminescent material layer emitting light of green wavelength band when receiving light emitted from the blue laser emitting element as excitation light and on which the diffuse transmission plate which diffusely transmits light emitted from the blue laser emitting element is provided in the circumferential direction.

In this light source unit, light source light of red wavelength band is produced by the red light emitting diode, and light source light of green wavelength band is produced by shining light emitted from the blue laser emitting element on to the green luminescent material layer on the luminescent wheel as excitation light. In addition, by causing light emitted from the blue laser emitting element to be diffuse transmitted through the diffuse transmission plate, light source light of blue wavelength band is produced.

In the light source unit according to the patent application filed by the applicant of this patent application, the optical paths of light of red wavelength band, light of green wavelength band and light of blue wavelength band are different from one another. Therefore, the optical layout becomes complex when attempting to cause the directions of optical axes of light of red wavelength band, light of green wavelength band and light of blue wavelength band to coincide with each other so as to be shone on to the display device.

In addition, the optical layout becomes complex, and therefore, the numbers of lenses and mirrors are increased, which disturbs the attempt to reduce the production costs, as well as to make the projector small in size.

Additionally, light of red wavelength band is produced by the red light emitting diode, and therefore, in order to increase the quantity of light of red wavelength band, a red light emitting diode which is large in size needs to be used or the number of red light emitting diodes needs to be increased.

Consequently, the solutions to the complex layout and the attempt to increase the quantity of light of red wavelength band cause disturbance to ensuring the degree of freedom in designing projectors which are small in size and which consume less electric power.

BRIEF SUMMARY OF THE INVENTION

The invention has been made in view of the problems inherent in the related art, and an object thereof is to provide a small light source unit and a projector which includes the small light source unit.

According to a first aspect of the invention, there is provided a light source unit including: a laser light source unit in which two types of laser emitting elements which emit light of different wavelength bands each other are arranged in a planar fashion; a diffusing unit disposed on an optical path of light emitted from the laser light source unit to diffuse light emitted from the laser light source unit; and a light source control unit which time-share controls the illumination of the laser emitting elements.

According to a second aspect of the invention, there is provided a projector comprising: the light source unit set forth in the first aspect; a display device which generates projection light; a light source side optical system which guides light emitted from the light source unit to the display device; a projection side optical system which guides projection light generated in the display device; and a projector control unit which controls the display device and the light source unit.

DETAILED DESCRIPTION OF THE PREFERRED EMBODIMENTS

Hereinafter, embodiment for carrying out the invention will be described by reference to the accompanying drawings.

Figure 1:
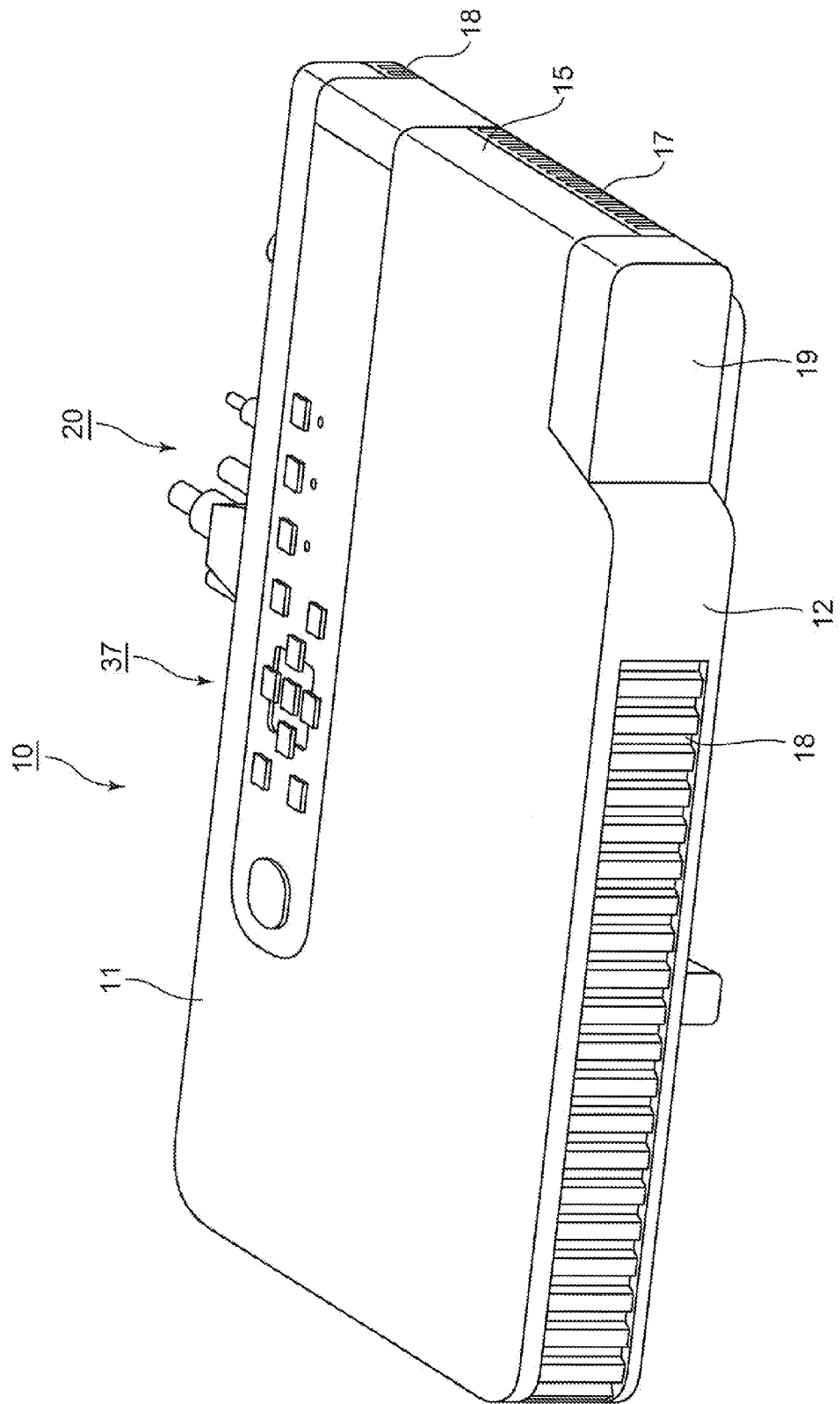
FIG. 1 is a perspective view showing an external appearance of a projector according to an embodiment of the invention.

FIG. 1 is a perspective view showing an external appearance of a projector 10.

In this embodiment, left and right with respect to the projector 10 denote, respectively, left and right directions with respect to a projecting direction, and front and rear denote, respectively, front and rear directions with respect to a direction towards a screen and a traveling direction of a pencil of light.

As is shown in FIG. 1, the projector 10 according to the embodiment has a substantially rectangular parallelepiped shape and has a lens cover 19 which covers a projection port which is laid to a side of a front panel 12 which is referred to as a front side panel of a main body casing, and the front panel 12 has a plurality of outside air inlet ports 18.

Further, although not shown, the projector 10 includes an Ir reception unit which is mounted in the front panel 12. The Ir reception unit receives a control signal from a remote controller.

In addition, a keys/indicators unit 37 is provided on an upper side panel 11 which makes up the main body casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when a light source unit, a display device, a control circuit or the like overheats.

Additionally, the upper side panel 11 covers the upper side and part of a left-hand side of the main body casing or the projector housing. The upper side panel 11 is configured as an opening/closing panel which can be opened for repair when the projector fails.

Further, provided on a back side or a back side panel of the housing are an input/output connector unit where USB terminals, an image signal input D-SUB terminal, an S terminal, an RCA terminal and the like are provided and various types of terminals 20 including a power supply adaptor plug and the like. A plurality of outside air inlet ports 18 are formed in the back side panel.

Additionally, pluralities of inside air outlet ports 17 are formed in a right-hand side panel which is a lateral side panel, not shown, of the housing and a left-hand side panel 15 which is a lateral side panel shown in FIG. 1.

In addition, outside air inlet ports 18 are also formed in a corner portion of the left-hand side panel 15 which lies in proximity to the back side panel.

Further, pluralities of outside air inlet ports or inside air outlet ports are also formed in a lower side or bottom side panel, not shown, in portions lying in proximity to the front, back, left-hand side and right-hand side panels.

The right-hand side panel and the left-hand side panel 15 are formed by combining side wall portions which are extensions of the upper side panel 11 and the bottom side panel.

Next, a projector control unit of the projector 10 will be described by use of a functional block diagram in FIG. 2.

The projector control unit includes a control unit 38, an input/output interface 22, an image transforming unit 23, a display encoder 24, a display drive unit 26 and the like.

The control unit 38 governs the control of respective operations of circuitries within the projector 10 and is made up of a CPU as a control unit, a ROM which stores in a fixed fashion operation programs of various types of settings and a RAM which is used as a work memory.

The input/output connector unit 21 is connected to the input/output interface 22.

Image signals of various standards that are inputted from the input/output connector unit 21 are sent via the input/output interface 22 and a system bus (SB) to the image transforming unit 23 where the image signals are transformed so as to be unified into an image signal of a predetermined format which is suitable for display. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display drive unit 26.

The display drive unit 26 drives a display device 51 which is a spatial optical modulator (SOM) at an appropriate frame rate in response to the image signal outputted from the display encoder 24.

In this projector 10, a pencil of light which is emitted from a light source unit 60 is shone onto the display device 51 via a light source side optical system to thereby form an optical image based on reflected light reflected by the display device 51. The image so formed is then projected on to a projecting surface for display via a projection side optical system.

A movable lens group 235 of the projection side optical system is driven by a lens motor 45 for zooming or focusing.

When in a reproducing mode, an image compression/expansion unit 31 reads out image data recorded on a memory card 32 and expands individual image data which make up a series of dynamic images frame by frame. Then, the image data is outputted to the display encoder 24 via the image transforming unit 23 so as to enable the display of dynamic images based on the image data stored on the memory card 32.

Operation signals generated at the keys/indicators unit 37 which is made up of the main keys and indicators provided on the upper side panel 11 of the main body casing are sent out directly to the control unit 38.

Key operation signals from the remote controller are received by the Ir reception unit 35, and a code signal demodulated at an Ir processing unit 36 is outputted to the control unit 38.

The control unit 38 controls a light source control circuit 41 which is configured as a light source control unit.

This light source control circuit 41 controls laser emitting elements included in a laser light source unit 70, which will be described later, for time sharing illumination and also controls a wheel motor 110 which is a drive unit so that light source light of a predetermined wavelength band which is required when images are reproduced is emitted from the light source unit 60.

In addition, the control unit 38 causes a cooling fan drive control circuit 43 to detect temperatures through a plurality of temperature sensors which are provided in the light source unit 60 and so on so as to control the rotating speed of a cooling fan based on the results of the temperature detection.

In addition, an audio processing unit 47 is connected to the control unit 38 via the system bus (SB).

This audio processing unit 47 includes a sound source circuit such as a PCM sound source. When in a projection mode and a reproducing mode, the audio processing unit 47 converts audio data into analog signals and drives a speaker 48 to output loudly sound or voice based on the audio data.

Next, an internal construction of the projector 10 will be described.

Figure 3:
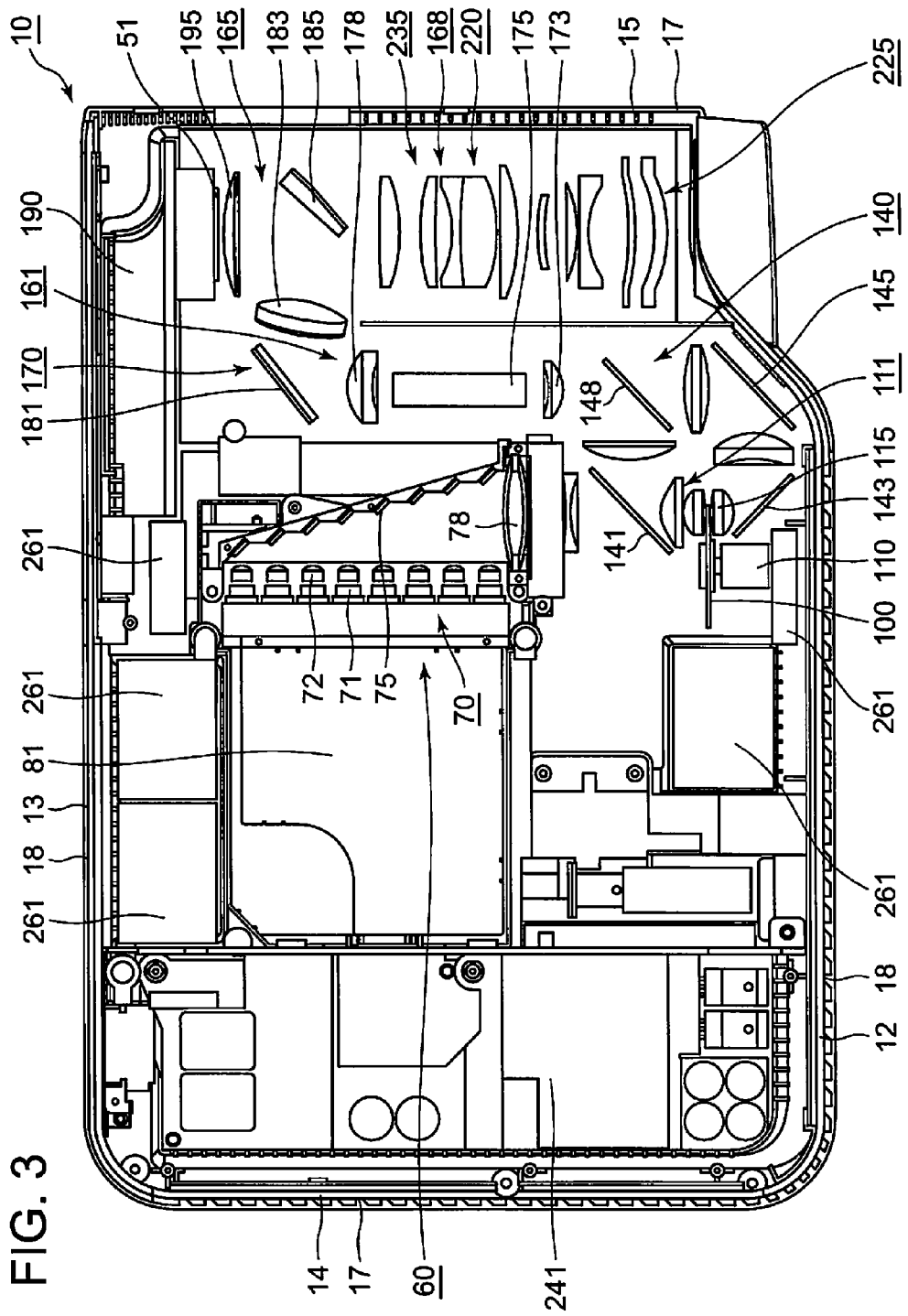
FIG. 3 is an exemplary plan view showing an internal construction of the projector.

FIG. 3 is an exemplary plan view showing an internal construction of the projector 10.

As is shown in FIG. 3, the projector 10 includes a control circuit board 241 which is disposed in proximity to the right-hand side panel 14.

This control circuit board 241 includes a power supply circuit block, a light source control block and so forth.

In addition, the projector 10 includes the light source unit 60 which is provided to a side of the power supply circuit board 241, that is, at a substantially central portion of the projector housing.

Further, in the projector housing the projector 10 includes an illumination side optical block 161 which is disposed to the left of the laser light source unit 70 included in the light source unit 60. The illumination side optical block 161 includes part of a light source side optical system 170 which is an optical system for guiding light emitted from the light source unit 60 to the display device 51.

In addition, an image generating optical block 165 is disposed in the proximity to a position where the back side panel 13 and the left-hand side panel 15 intersect each other. The image generating optical block 165 includes part of the light source side optical system 170, the display device 51 and part of a projection side optical system 220 which is an optical system for projecting projection light generated in the display device 51 on to a screen.

Further, a projection side optical block 168 which includes the projection side optical system 220 is disposed in front of the image generating optical block 165.

The light source side optical system 170 which is included in the illumination side optical block 161 includes a light tunnel 175 which forms a pencil of light emitted from the light source unit 60 into a pencil of light whose intensity is uniformly distributed across the width thereof, a collective lens 178 which collects light emitted from the light tunnel 175 and an optical axis changing mirror 181 which changes an optical axis of a pencil of light emitted from the light tunnel 175 in the direction of the image generating optical block 165.

The light source side optical system 170 which is included in the image generating optical block 165 includes a collective lens 183 which concentrates light source light which is reflected on the optical axis changing mirror 181 into the display device 51 and a shining mirror 185 which shines a pencil of light which is transmitted through the collective lens 183 on to the display device 51 at a predetermined angle.

In addition, in the image generating optical block 165, a cooling unit 190 such as a heat sink for cooling the display device 51 is disposed between a DMD, which is the display device 51, and the back side panel 13. The display device 51 is cooled by this heat sink.

A condenser lens 195 is disposed in the proximity to a front of the display device 51. The condenser lens 195 makes up part of the projection side optical system 220.

The projection side optical block 168 includes, as part of the projection side optical system 220, a fixed lens group 225 which is incorporated in a fixed lens barrel and a movable lens group 235 which is incorporated in a movable lens barrel.

The projection side optical system 220 is configured as a variable-focus lens having a zooming function, whereby the variable-focus lens enables zooming and focusing operations by moving the movable lens group 235 by a lens motor.

Next, the light source unit 60 of the embodiment will be described in detail.

The light source unit 60 includes the laser light source unit 70 which emits light of red wavelength band and light of blue wavelength band, a light emitting plate 100 which functions not only to diffusely transmit light of red wavelength band and light of blue wavelength band which are emitted from the laser light source unit but also to generate green luminous light by using light of blue wavelength band emitted from the laser light source unit 70 as excitation light, the wheel motor 110 which functions as a drive unit for moving the light emitting plate 100, a light guiding optical system 140 which guides light emitted from laser light source unit 170 to the light emitting plate 100 and also guides light emitted from the light emitting plate 100 to an entrance opening of the light tunnel 175, and a cooling unit 81 and a cooling fan 261 which cool the laser light source unit 70 and the light emitting plate 100.

The laser light source unit 70 is disposed at a substantially central portion in a left-to-right direction of the projector housing, in the proximity to the back side panel 13 so that an optical axis of light emitted therefrom becomes parallel to the back side panel 13.

Figure 4:
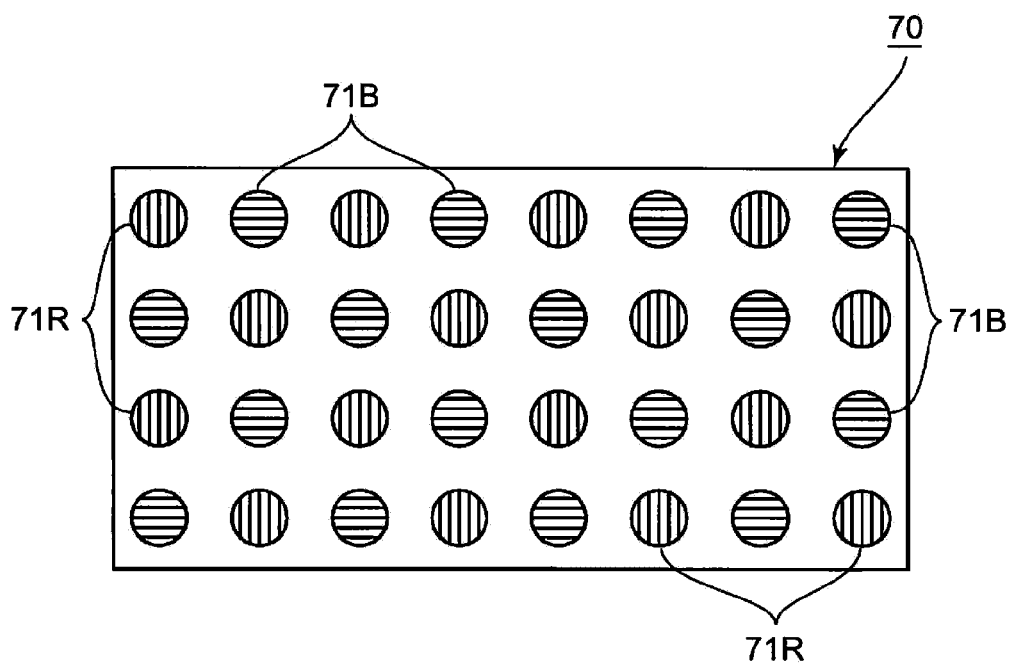
FIG. 4 is an exemplary front view of a laser light source unit included in the projector.

In this laser light source unit 70, as FIG. 4 shows, 16 blue laser emitting elements 71B and 16 red laser emitting elements 71R are arranged in four rows and eight columns (four rows in a predetermined direction and eight columns in a direction which is at right angles to the predetermined direction) into a checkered pattern (the blue laser emitting elements 71B and the red laser emitting elements 71R are disposed adjacent to each other in an alternate fashion vertically and horizontally).

As FIG. 3 shows, collimator lenses 72 are disposed individually in front of the corresponding laser emitting elements 71.

Namely, in the laser light source unit 70, pluralities of two types of laser emitting elements which emit light of different wavelength bands are arranged in a planar fashion.

A plurality of reflecting mirrors 75 are arranged in a step-like fashion so as to lie individually in front of the corresponding laser emitting elements 71. These reflecting mirrors 75 make up part of the light guiding optical system 140 and function to change directions of optical axes of laser beams emitted from the individual laser emitting elements 71 by 90 degrees in the direction of the front side panel 12. A collective lens 78 is disposed on optical axes of laser beams which are reflected by the reflecting mirrors 75.

These reflecting mirrors 75 reflect pencils of light emitted from the laser emitting elements 71 of the laser light source unit 70 while narrowing distances between the pencils of light to thereby reduce a cross-sectional area of a pencil of laser beams which is emitted from the laser light source unit 70.

In addition, a cooling unit 81 such as a heat sink is disposed between the laser light source unit 70 and the right-hand side panel 14 for cooling the laser light source unit 70. A cooling fan 261 is disposed between the heat sink and the back side panel 13.

As FIG. 3 shows, the light emitting plate 100 is disposed so that part thereof is positioned on an optical path of a pencil of laser beams emerging from the laser light source unit 70 which are reflected on the reflecting mirrors 75.

Figure 5:
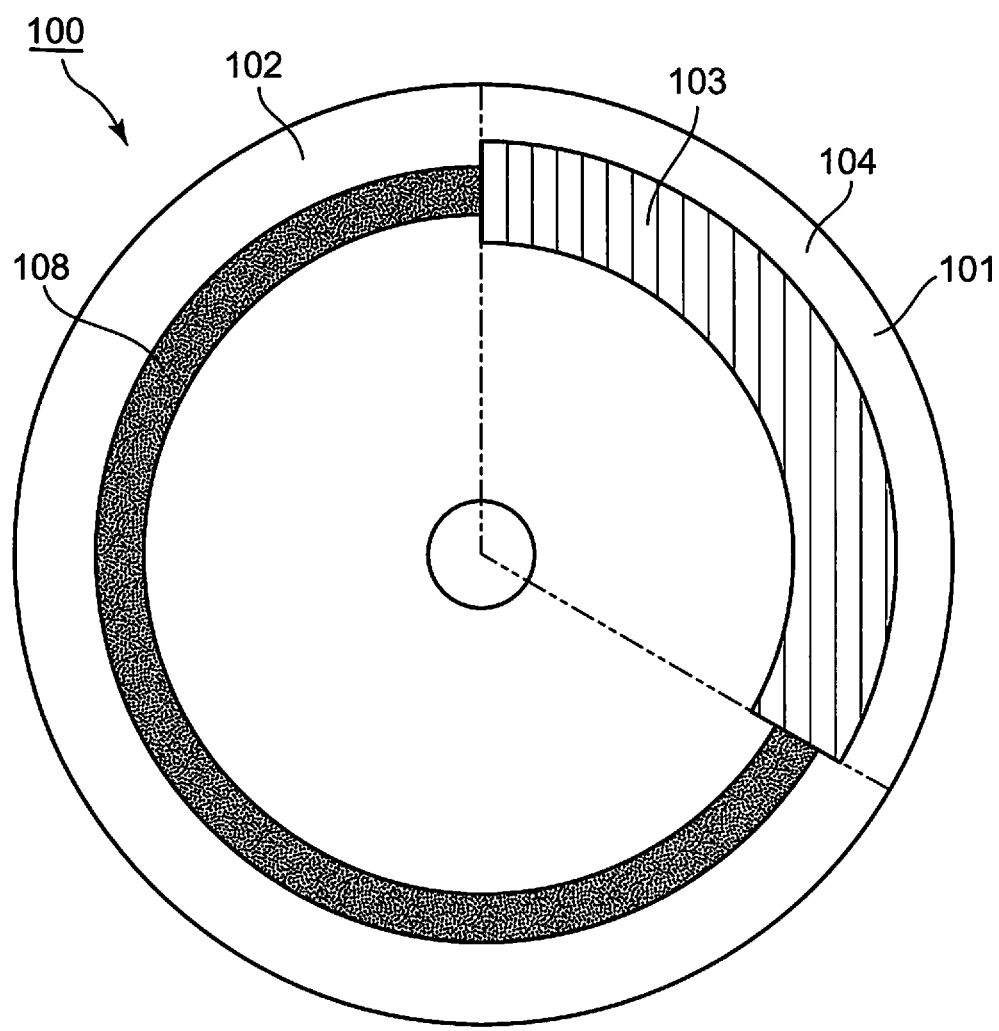
FIG. 5 is an exemplary front view of a light emitting plate included in the projector.

As FIG. 5 shows, a luminous light emitting segment 101 and a diffuse segment 102 are provided end to end in a circumferential direction on the light emitting plate 100. The luminous light emitting segment 101 emits light of green wavelength band by receiving light of blue wavelength band which is emitted from the laser light source unit 70. The diffuse segment 102 diffusely transmits light emitted from the laser light source unit 70.

The luminous light emitting segment 101 on the light emitting plate 100 is formed of a luminescent plate 104. A surface of the luminescent plate 104 is formed into a reflecting surface by depositing silver on the surface, and a belt-like green luminescent material layer 103 is applied into an arc shape on the reflecting surface of the luminescent plate 104.

The green luminescent material layer 103 is made up of a green luminescent material such as YAG which emits luminous light of green wavelength band by receiving light of blue wavelength band which is emitted from the laser light source unit 70 as excitation light and a transparent binder such as glass in which the green luminescent material is uniformly dispersed.

A belt-like opening is formed into an arc shape in the diffuse segment 102 on the light emitting plate 100, and a diffuse transmission plate 108 is installed in the opening.

In addition, as FIG. 3 shows, the wheel motor 110 connects to the light emitting plate 100 as a driving-device so as to rotationally drive the light emitting plate 100.

A cooling fan 261 is disposed between the wheel motor 110 and the front side panel 12, and the light emitting plate 100 is cooled by this cooling fan 261.

A first dichroic mirror 141, which makes up a part of the light guiding optical system 140, is disposed between the light emitting plate 100 and the collective lens 78. This first dichroic mirror 141 transmits light emitted from the laser light source unit 70, that is, light of red wavelength band and light of blue wavelength band and reflects luminous light emitted from the light emitting plate 100, that is, light of green wavelength band.

Further, a collective lens group 111, which makes up a part of the light guiding optical system 140, is disposed between the first dichroic mirror 141 and the light emitting plate 100. This collective lens group 111 collects pencils of light emitted in the direction of the back side panel 13 from the light emitting plate 100. In addition, a collective lens 115, which makes up a part of the light guiding optical system 140, is disposed between the light emitting plate 100 and the front side panel 12. This collective lens 115 collects pencils of light emitted in the direction of the front side panel 12 from the light emitting plate 100.

Additionally, a first reflecting mirror 143 is disposed on an optical axis of a pencil of light which is diffusely transmitted through the light emitting plate 100, that is, between the collective lens 115 and the front side panel 12. This first reflecting mirror changes the optical axis of the diffusely transmitted light by 90 degrees in the direction of the left-hand side panel 15.

Further, a second reflecting mirror 145 is disposed on an optical axis of the diffusely transmitted light which is reflected on the first reflecting mirror 143. This second reflecting mirror changes the optical axis of the diffusely transmitted light by 90 degrees in the direction of the back side panel 13.

A second dichroic mirror 148 is disposed in a position where the optical axis of the luminous light which is reflected on the first dichroic mirror 141 intersects the optical axis of light of blue wavelength band which is reflected on the second reflecting mirror 145. This second dichroic mirror 148 transmits light of red and blue wavelength bands and reflects light of green wavelength band so that the optical axis of the green light changes by 90 degrees in the direction of the back side panel 13.

Additionally, a collective lens is disposed individually between the dichroic mirrors 141, 148 and between the reflecting mirrors 143 and 145.

Further, a collective lens 173 is disposed in proximity to an incident plane of the light tunnel 175. This collective lens 173 concentrates light source light to the entrance opening of the light tunnel 175.

Figure 2:
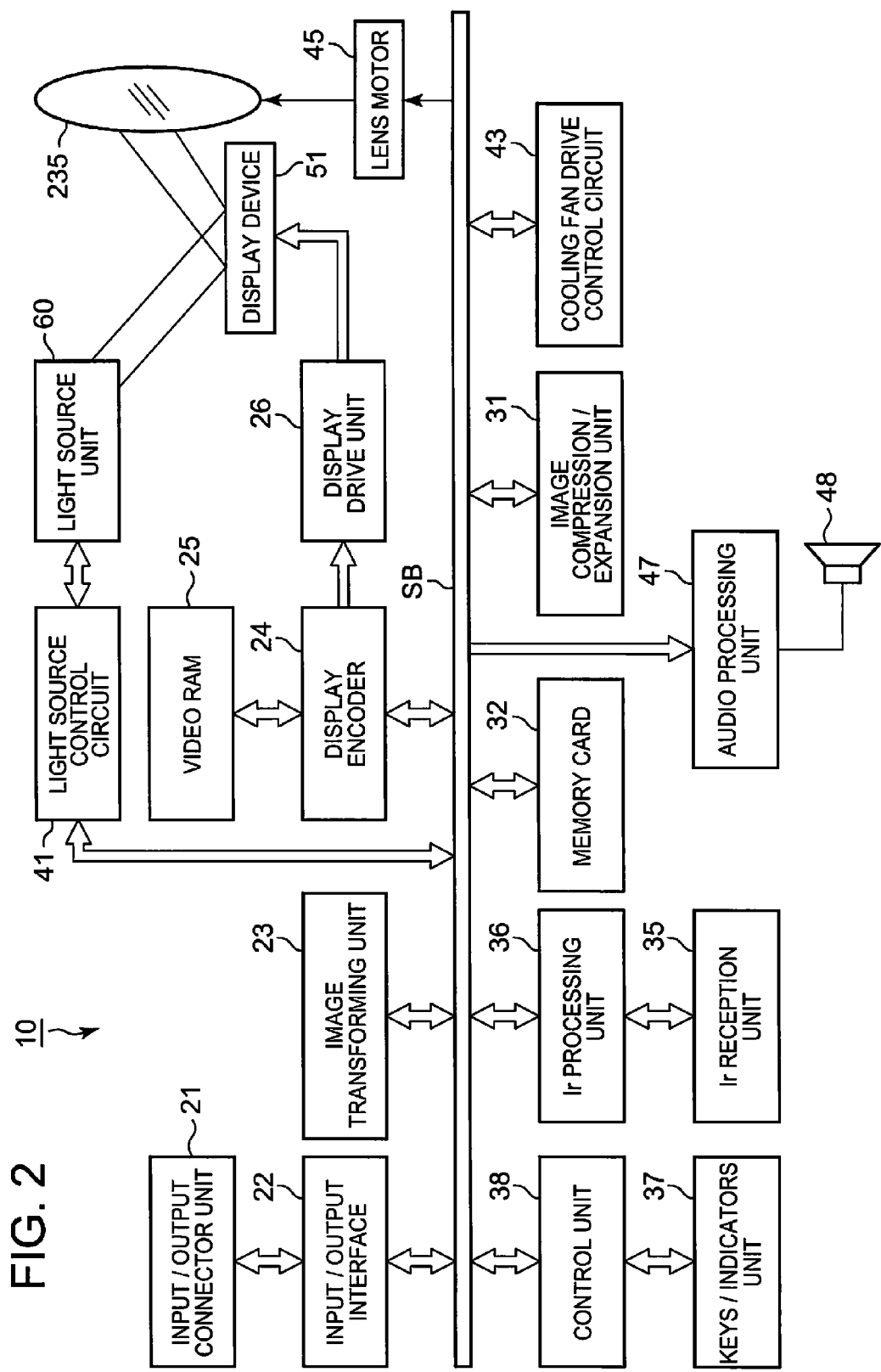
FIG. 2 is a functional block diagram of the projector.

The light source unit 60 of the embodiment which is configured as has been described heretofore generates light source light of a desired wavelength band by controlling the illumination of the red laser emitting elements 71R and the blue laser emitting elements 71B and the rotation of the wheel motor 110 which is the drive unit by the light source control circuit 41 shown in FIG. 2.

Specifically speaking, when generating light source light of red wavelength band, the light source control circuit 41 turns on the red laser emitting elements 71R of the laser light source unit 70 and controls the wheel motor 110 so that the diffuse transmission plate 108 is positioned on an optical path of the red laser beam.

In addition, when generating light source light of blue wavelength band, the light source control circuit 41 turns on the blue laser emitting elements 71B of the laser light source unit 70 and controls the wheel motor 110 so that the diffuse transmission plate 108 is positioned on an optical path of the blue laser beam.

Further, when generating light source light of green wavelength band, the light source control circuit 41 turns on the blue laser emitting elements 71B of the laser light source unit 70 and controls the wheel motor 110 so that the green luminescent material layer 103 is positioned on the optical path of the blue laser beam.

In addition, the light source unit 60 of the embodiment can also generate magenta as a complementary color.

As this occurs, the light source control circuit 41 turns on the red laser emitting elements 71R and the blue laser emitting elements 71B and controls the wheel motor 110 so that the diffuse transmission plate 108 is positioned on the optical paths of the red and blue laser beams.

Although a light emitting wheel is used as the light emitting plate 100, the invention is not limited thereto. Any configuration may be adopted, provided that the diffuse transmission plate 108 as a diffusing unit and the luminescent plate 104 having the green luminescent material layer are provide end to end.

Namely, a rectangular light emitting plate or a light emitting plate of any other shape can be used.

In addition, a configuration may be adopted in which an actuator which can move the light emitting plate 100 in a linear fashion is used as a drive unit in place of the wheel motor 110.

Namely, since the luminescent plate 104 or the diffuse transmission plate 108 only has to be positioned so as to move on the optical path of light emitted from the laser light source unit 70, a light polarizer using a KIN crystal, an acousto-optic element or an MEMS mirror may be adopted as a drive unit.

In this way, in the projector 10 of this embodiment, the light source light of red wavelength band is generated by the red laser emitting elements 71R, and therefore, compared with a case where light of red wavelength band is generated by using a red light emitting diode, highly bright light of red wavelength band can be projected with low consumed power.

Namely, the projector 10 of this embodiment is configured so as to use, as a light source light, light which is diffusely transmitted through the light emitting plate 100 (or which is emitted in a luminescent fashion) as a result of shining a highly directive laser beam on the light emitting plate 100.

Consequently, since the sectional area of the laser beam shone on the light emitting plate 100 is small, light that has been diffusely transmitted through the light emitting plate 100 also becomes light having a high output and a low Etendue value.

This decreases light which cannot be used in projection and which is generated when the Etendue of light emitted from the light source unit 60 is larger than the Etendue of the display device 51.

Consequently, the utilization efficiency of light emitted from the laser emitting elements 71 can be increased, whereby projection with low consumed power can be realized.

Etendue is a value which represents a spatial expansion where a bundle of light which is effectively handled in an optical system exists as a product of area and solid angle.

In addition, when compared with the configuration disclosed in the previous patent application filed by the applicant of this patent application in which the unit for generating light of red wavelength band is provided separately from the laser light source unit 70 and the light emitting plate 100, in this embodiment, light source light of red wavelength band and light source light of blue wavelength band are guided into the light tunnel 175 along the same optical path, which results in a simple optical layout.

Consequently, the light source unit 60 can be made smaller in size.

In addition, the laser light source unit 70 is formed by providing the red laser emitting elements 71R and the blue laser emitting elements 71B which are arranged in the checkered pattern. Therefore, magenta can be generated by mixing red light with blue light.

Then, the light source control circuit 41, which is the light source control unit, performs an illumination control including a control to make the different types of laser emitting elements 71 turn on at the same time to generate a complementary color (magenta in this embodiment), thereby making it possible to provide the projector 10 which can enable a projection having a superior color reproducibility.

In addition, by disposing the light emitting plate 100, on which the diffuse transmission plate 108 and the luminescent plate 104 are provided end to end, on the optical path of light emitted from the laser light source unit 70, light of green wavelength band can be generated by using the blue laser beam as excitation light, and the highly directive laser beam can be converted into safe light having low directivity by the diffuse transmission plate 108.

Additionally, by providing the drive unit for driving the light emitting plate 100 the laser beam is shone only on part of the light emitting plate 100, thereby making it possible to prevent the light emitting plate 100 from being heated.

Further, when forming the laser light source unit 70 by arranging the 16 blue laser emitting elements 71B and 16 red laser emitting elements 71R in four rows and eight columns so as to form the checkered pattern, the respective laser emitting elements 71B, 71R can be arranged on the flat plane with good balance.

In FIG. 4, the configuration is shown in which 16 blue laser emitting elements 71B and 16 red laser emitting elements 71R are provided, so that the laser emitting elements 71R, 71B are arranged alternately vertically and horizontally so as to be formed into the checkered pattern. However, FIG. 4 only illustrates one example of the numbers and arranging order of the laser emitting elements 71R, 71B.

Different numbers of laser emitting elements 71R, 71B may be adopted, and the arranging order of laser emitting elements 71R, 71B may be altered.

Namely, the numbers and arranging order of blue laser emitting elements 71B and red laser emitting elements 71R are controlled in consideration of luminance balance between the blue and red laser emitting elements 71B, 71R and respective quantities of luminescence, heat values, consumed power, luminous efficiencies and time of luminescence of the red and blue laser emitting elements 71R, 71B when a projection is made or are controlled in consideration of the application of a projector 10 such as a projector specialized in luminance or a projector specialized in color saturation.

Hereinafter, another example of configuration of a laser light source unit 70 will be described which includes the numbers and arrangement of laser emitting elements 71R, 71B in the laser light source unit 70.

In the case of a projector 10 which is specialized in luminance, that is, in the case of a projector 10 for use in a bright place like one for presentation, the number of blue laser emitting elements 71B is increased to increase the quantity of light of blue wavelength band having a low luminance (nit: $cd/m^2$), while the number of red laser emitting elements 71R having a high luminance is decreased, thereby making it possible to increase the luminance of projection light.

Figure 6:
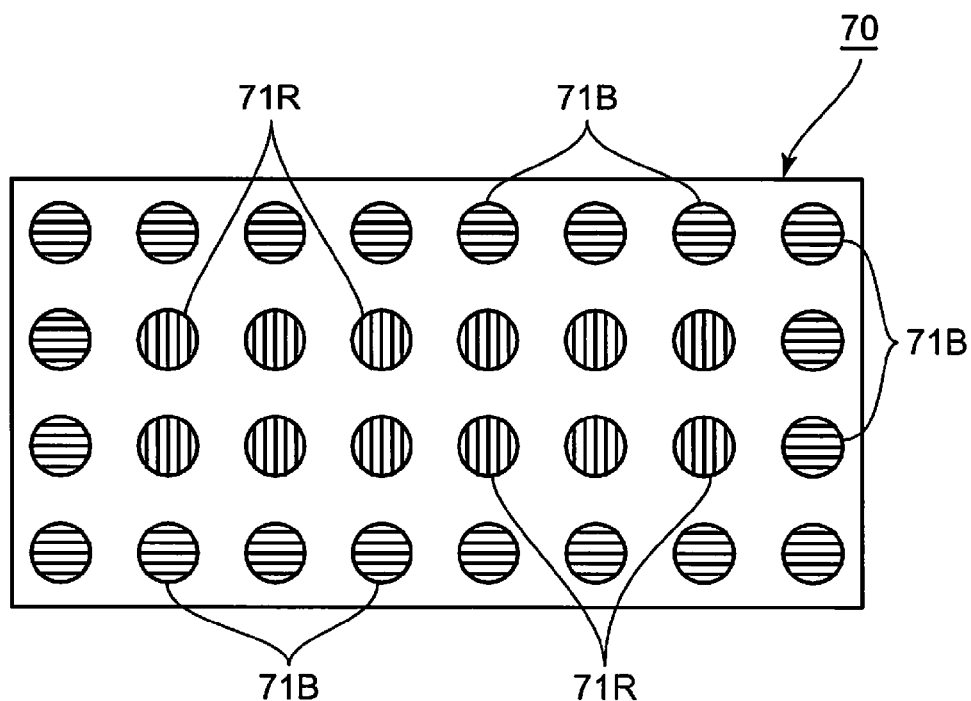
FIG. 6 is an exemplary front view of another laser light source unit.

Namely, as FIG. 6 shows, a laser light source unit 70 in a projector 10 of a high luminance mode includes 20 blue laser emitting elements 71B having a low luminance and 12 red laser emitting elements 71R having a high luminance.

In this way, by controlling the numbers of laser emitting elements of different types so that the number of laser emitting elements which emit a laser beam of a wavelength band having a lower luminance is larger than the number of laser emitting elements which emit a laser beam of a wavelength band having a higher luminance, the laser light source unit 70 can emit different types of laser beams of each wavelength band having a high luminance.

Consequently, the projector 10 including this laser light source unit 70 can project an image of a high luminance.

In addition, in this laser light source unit 70, red laser emitting elements 71R having a shorter luminescence time are arranged in two rows and six columns at a central portion of the laser light source unit 70, and blue laser emitting elements 71B having a longer luminescence time are arranged so as to surround the periphery of the red laser emitting elements 71R so arranged.

Namely, in the laser light source unit 70, the laser emitting elements which emit the light of the wavelength band having the longer luminescence time are arranged further outwards than the laser emitting elements which emit the light of the wavelength band having the shorter luminescence time.

In this way, by arranging the laser emitting elements which emit the light of the wavelength band having the longer luminescence time on the outer side of the laser light source unit 70, the laser emitting elements whose heat value is increased due to the longer luminescence time can be arranged in positions where the laser emitting elements are easily subjected to a flow of air, thereby making it possible to increase the cooling efficiency thereof.

By arranging the laser emitting elements in the way described above, the service life of each of the laser emitting elements can be extended. In addition, the occurrence of a problem that the luminous efficiency of the laser emitting elements is decreased due to them being heated can be prevented.

The reason why the blue laser emitting elements 71B have the longer luminescence time is that as has been described above, the blue laser emitting elements 71B are turned on when generating light source light of blue wavelength band and light source light of green wavelength band while the red laser emitting elements 71R are turned on only when generating light source light of red wavelength band.

In the configuration of the light source unit 60 according to the embodiment, as the quantity of light of blue wavelength band increases, the quantity of light of green wavelength band increases.

Because of this, it is desirable to control the time during which blue laser beam is shone on to the green luminescent material layer 103 or to control the illumination of the blue laser emitting elements 71B such that only predetermined ones of the blue laser emitting elements 71B are turned on at timings at which the blue laser emitting elements 71B are turned on to emit excitation light so as to balance the luminances of the three primary colors.

The laser emitting elements having the longer luminescence time are described as those having the larger heat value, and the laser emitting elements having the longer luminescence time are arranged on the outer side of the laser light source unit.

However, laser emitting elements which consume more power due to their low luminous efficiency tend to have a larger heat value. Therefore, laser emitting elements having high consumes power may be arranged on the outer side of the laser light source unit.

Namely, adopting the configuration in which laser emitting elements having a larger heat value are arranged in positions where they can easily be cooled can provide an advantage that the cooling efficiency is increased.

Figure 7:
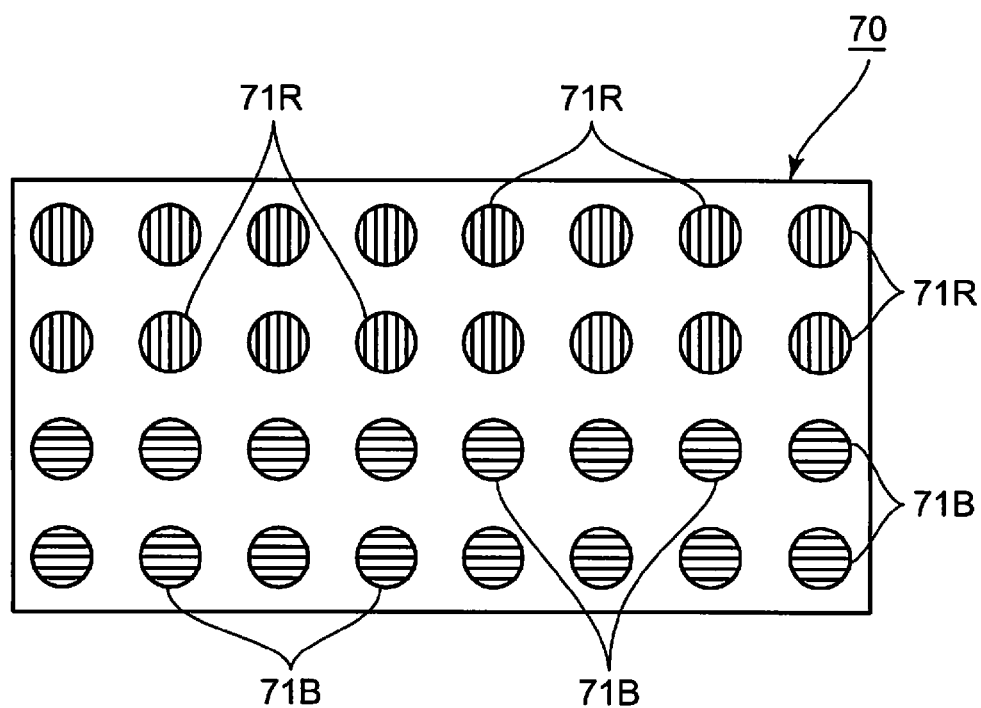
FIG. 7 is an exemplary front view of a further laser light source unit.

In addition, in the laser light source unit 70, a configuration may be adopted in which as FIG. 7 shows, the blue laser emitting elements 71B having the longer luminescence time (the larger heat value) are arranged at a lower portion in the direction of gravity, while the red laser emitting elements 71R having the shorter luminescence time (the smaller heating value) are arranged at an upper portion in the direction of gravity.

Namely, in the laser light source unit 70, the laser emitting elements which emit light of the wavelength band having the longer luminescence time are arranged further downwards than the laser emitting elements which emit light of the wavelength band having the shorter luminescence time.

By adopting this arrangement, the laser emitting elements having the high heat value are positioned at the lower portion of the laser light source unit 70 where low-temperature air flows, whereby the cooling efficiency in the laser light source unit 70 can be increased.

In the laser light source unit 70 shown in FIG. 7, 16 blue laser emitting elements 71B and 16 red laser emitting elements 71R are provided. The red laser emitting elements 71R are arranged in two rows and eight columns at the upper portion, while the blue laser emitting elements 71B are arranged in two rows and eight columns below the red laser emitting elements 71R. However, even when the numbers of blue and red laser emitting elements 71B, 71R are changed, the laser emitting elements having the larger heat value are arranged at the lower portion of the laser light source unit 70.

In a projector 10 which is specialized in color saturation, the numbers of blue and red laser emitting elements 71B, 71R are determined so that the luminous fluxes (lm: lumen) of light of blue wavelength band and light of red wavelength band become uniform (approach each other).

Namely, the luminous fluxes of light source light of red wavelength band and light source light of blue wavelength band which are generated by being emitted from the blue and red laser emitting elements 71B, 71R, respectively are compared, and the numbers of blue and red laser emitting elements 71B, 71R are determined so that the luminous fluxes of the light of blue wavelength and the light of red wavelength band approximate to each other.

In this way, determining the numbers of blue and red laser emitting elements 71B, 71R based on their luminous fluxes enables a projection with high color reproducibility.

Light of green wavelength band is luminous light which is generated by using light of blue wavelength band as excitation light. Therefore, the laser emitting elements 71B, 71R are controlled so that the luminous flux of light of green wavelength band is equal to the fluxes of light of red wavelength band and light of blue wavelength band.

In this way, in producing a laser light source unit 70, by determining the numbers of blue laser emitting elements 71B and red laser emitting elements 71R in consideration of the application of a projector 10 such as a projector specialized in luminance or a projector specialized in color saturation, the luminance and color reproducibility of a projection image can be increased.

In addition, by determining the arranging order of blue and red laser emitting elements 71B, 71R in consideration of luminance balance between the blue and red laser emitting elements 71B, 71R and respective quantities of luminescence, heat values, consumed power, luminous efficiencies and time of luminescence of the blue and red laser emitting elements 71B, 71R when a projection is made, the cooling efficiency can be increased.

Next, the other embodiment of the invention will be described.

A projector of this embodiment is similar to the projector 10 of the embodiment that has been described above excluding the configuration of a light source unit 60. Therefore, the description of features of the projector 10 other than the configuration of the light source unit 60 will be omitted.

Figure 8:
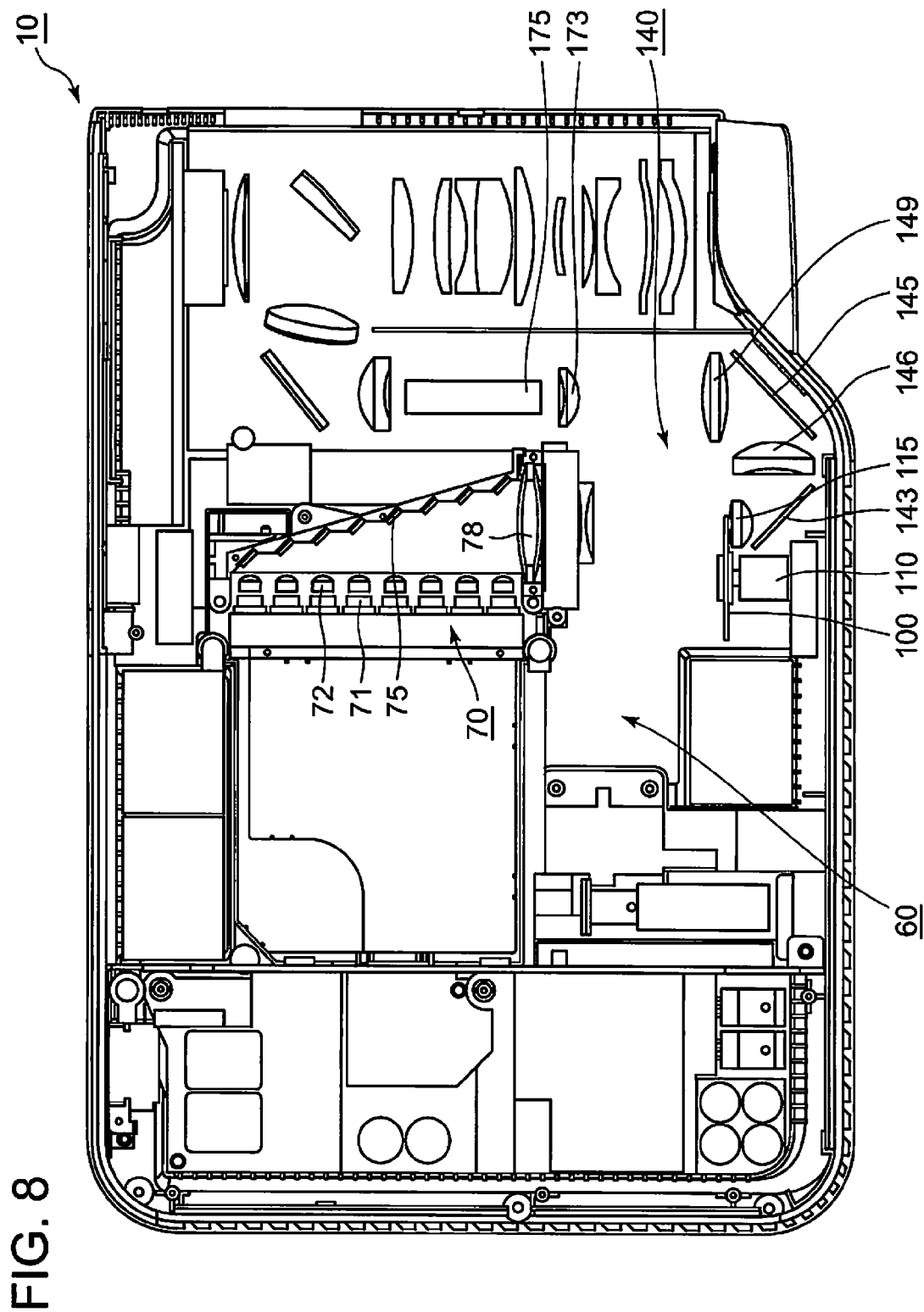
FIG. 8 is an exemplary plan view showing an internal construction of a projector according to other embodiment of the invention.

Similar to that of the previous embodiment, the projector 10 of this embodiment includes a light source unit 60 which is made up of, as FIG. 8 shows, a laser light source unit 70, a light emitting plate 100 which is disposed on an optical path of light emitted from the laser light source unit 70 and which functions as a diffusing unit, a light guiding optical system 140 which guides light emitted from the laser light source unit 70 to the light emitting plate 100 and which also guides light emitted from the light emitting plate 100 to an entrance opening of a light tunnel 175 and the light source control circuit 41 shown in FIG. 2.

Figure 9:
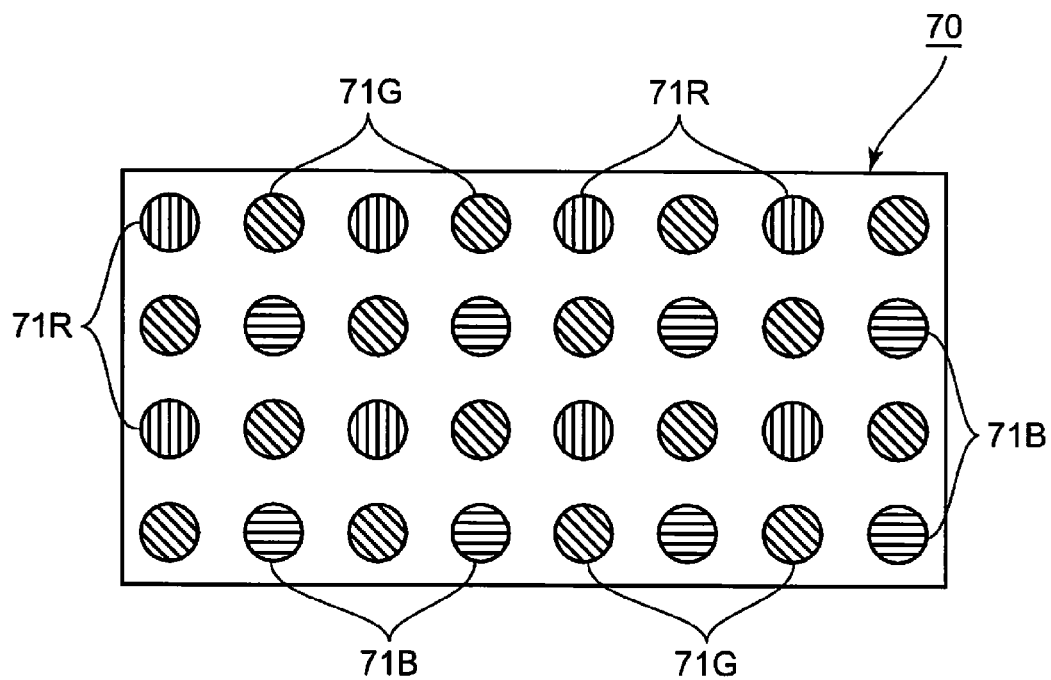
FIG. 9 is an exemplary front view of a laser light source unit included in the projector according to the other embodiment.

As FIG. 9 shows, in the laser light source unit 70, pluralities of red laser emitting elements 71R, green laser emitting elements 71G and blue laser emitting elements 71R are arranged in four rows and eight columns.

Namely, in the laser light source unit 70, pluralities of laser emitting elements 71 of three different types are arranged in a planar fashion.

Then, the illumination of the red, green and blue laser emitting elements 71R, 71G, 71B are controlled by the light source control circuit 41.

As has already been described by reference to FIGS. 6 and 7, the numbers and arranging order of the red, green and blue laser emitting elements 71R, 71G, 71B are determined based on luminance balance among the red, green and blue laser emitting elements 71R, 71G, 71B and respective quantities of luminescence, heat values, consumed power, luminous efficiencies and time of luminescence of the red, green and blue laser emitting elements 71R, 71G, 71B when a projection is made.

Figure 10:
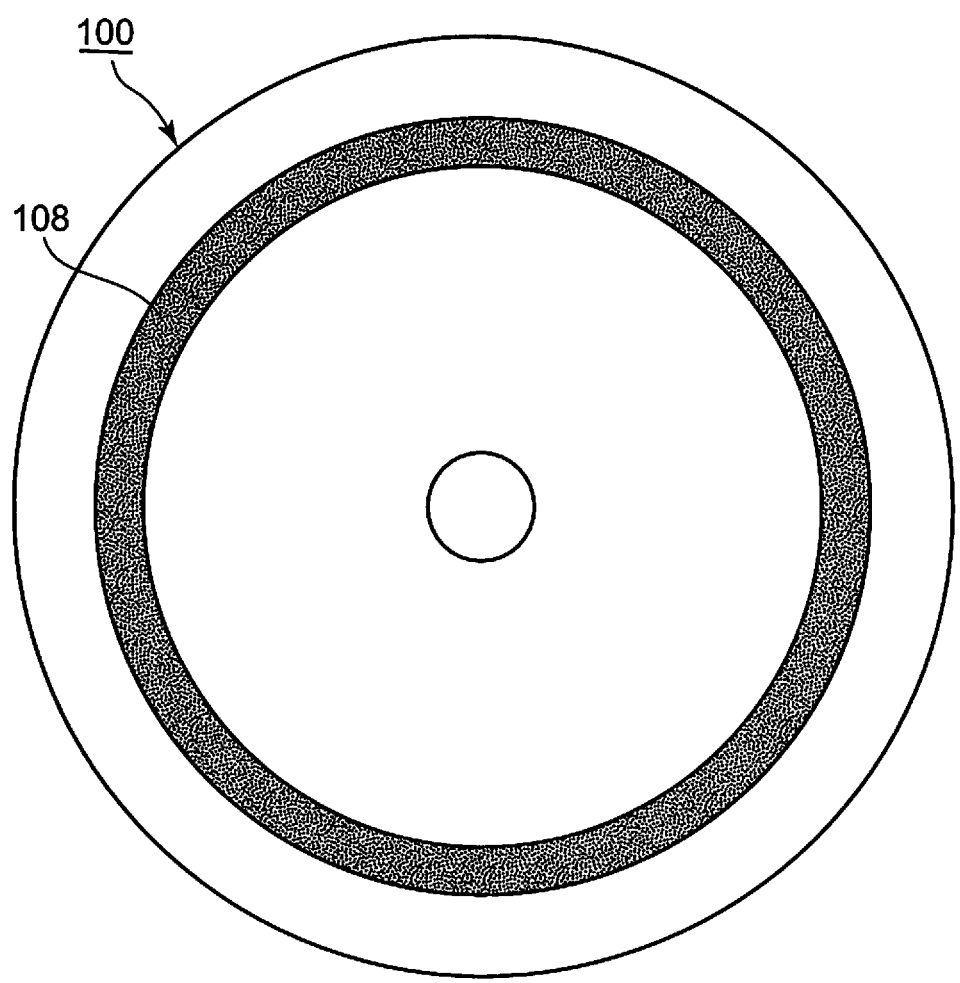
FIG. 10 is an exemplary front view of a light emitting plate included in the projector according to the other embodiment.

As FIG. 10 shows, the light emitting plate 100 is a luminescent wheel on which an annular diffuse transmission plate 108 is placed. A wheel motor 110 is coupled to the light emitting plate 100 and functions as a drive unit for rotationally driving the luminescent wheel.

The driving of the wheel motor 110 is also controlled by the light source control circuit 41.

In this embodiment, too, as with the previous embodiment, a rectangular light emitting plate 100 may be used. Alternatively, only the diffuse transmission plate 108 may be disposed in place of the light emitting plate 100.

Further, any other means than the wheel motor 110 may be adopted as a drive unit. Alternatively, the light emitting plate 100 may be fixed without providing any drive unit.

However, by making the light emitting plate 100 movable, the light emitting plate 100 can be prevented from being heated, and therefore, it is desirable that the light emitting plate 100 is configured as movable.

The light guiding optical system 140 includes a plurality of reflecting mirrors 75 which are disposed in front of the laser light source unit 70, a collective lens 78 which collects laser beams which are reflected by the reflecting mirrors 75, a collective lens 115 which collects pencils of light emitted from the light emitting plate 100 in the direction of a front side panel 12, a first reflecting mirror 143 which is disposed between the collective lens 115 and the front side panel 12 to change an optical axis of light diffusely transmitted through the light emitting plate 100 by 90 degrees towards a left-hand side panel 15, a second reflecting mirror 145 which is disposed on an optical axis of the diffusely transmitted light which is reflected by the first reflecting mirror 143 to change the optical axis of the diffusely transmitted light by 90 degrees towards a back side panel 13, a collective lens 173 which concentrates the diffusely transmitted light reflected by the second reflecting mirror 145 to the entrance opening of the light tunnel 175, and collective lenses 146, 149 which are disposed between the first reflecting mirror 143 and the second reflecting mirror 145 and between the second reflecting mirror 145 and the collective lens 173, respectively.

In this light source unit 60, when generating light source light of red wavelength band, light source light of green wavelength band and light source light of blue wavelength band, the corresponding laser emitting elements 71R, 71G, 71B are turned on. Then, laser beams emitted from the red, green and blue laser emitting elements 71R, 71G, 71B are diffusely transmitted through the light emitting plate 100, whereby light of respective wavelength bands is generated.

In addition, in this light source unit 60, by turning on any two or all of the red, green and blue laser emitting elements 71R, 71G, 71B at the same time, light of a complementary color such as cyan, magenta and yellow or white light can also be generated.

In the projector 10 of this embodiment, laser beans from a plurality of laser emitting elements 71 are shone so as to be concentrated to a limited range on the light emitting plate 100. Thus, an increase in Etendue can be prevented while emitting highly bright diffuse light from the limited range on the light emitting plate 100.

Further, in the projector 10 which includes the light source unit 60, since the light source unit 60 can generate light of a complementary light or white light, when a projection is made while placing emphasis on color saturation, the complementary colors can be used in addition to the three primary colors, thereby making it possible to increase color reproducibility.

In addition, when placing emphasis on luminance, it is possible to use white light in addition to the three primary colors, whereby highly bright light can be projected.

Namely, various projection modes can be realized easily and optimally.

In addition, light of red wavelength band, light of green wavelength band and light of blue wavelength band are guided as far as the light tunnel 175 along the same optical path. Therefore, no dichroic mirror needs to be provided, thereby reducing the size of an optical system.

Consequently, a simple optical layout can result, thereby making it possible to realize easily a projector 10 which is small in size and low in price.

The invention is not limited to the embodiments that have been described heretofore but can be altered or improved freely without departing from the spirit and scope of the invention.

What is claimed is:

1. A projector comprising:
a light source unit which comprises:
a laser light source unit in which two or more types of laser emitting elements are arranged in a planar fashion on a same plane, wherein the laser emitting elements emit light having wavelength bands that are different from each other;
a diffusing unit disposed on an optical path of the light emitted from the laser light source unit to diffuse the light emitted from the laser light source unit; and
a light source control unit which controls illumination of the laser emitting elements in a time sharing manner in accordance with the types of the laser emitting elements, wherein the light source control unit controls the illumination of the laser emitting elements such that blue laser emitting elements have a longer luminescence time among the two or more types of laser emitting elements, and such that red laser emitting elements have a shorter luminescence time among the two of more types of laser emitting elements;
a display device which generates projection light;
a light source side optical system which guides light emitted from the light source unit to the display device;
a projection side optical system which guides projection light generated by the display device; and
a projector control unit which controls the display device and the light source unit;
wherein, in the laser light source unit, all of the blue laser emitting elements which have a longer luminescence time among the two or more types of laser emitting elements are arranged in a lower portion of the plane in a vertical direction than all of the red laser emitting elements which have a shorter luminescence time among the two of more Noes of laser emitting elements, such that all of the blue laser emitting elements are arranged lower in a housing of the oroiector than all of the red laser emitting elements.

2. The projector as set forth in claim 1, wherein in the laser light source unit, numbers of the two or more types of laser emitting elements differ from each other.

3. The projector as set forth in claim 2, wherein in the laser light source unit, the number of laser emitting elements which are of a type having a smaller luminance among the two or more types of laser emitting elements is larger than the number of laser emitting elements of a type having a larger luminance.

4. The projector as set forth in claim 1, further comprising:
a light emitting plate disposed on the optical path of the light emitted from the laser light source unit; and
a drive unit to drive the light emitting plate;
wherein the light emitting plate comprises a diffuse transmission plate as the diffusing unit and a luminescent plate which includes a reflecting surface on which a green luminescent material layer is laid, the diffuse transmission plate and the luminescent plate being provided end to end; and wherein the light source control unit controls the drive unit so that the diffuse transmission plate or the luminescent plate is positioned on the optical path of the light emitted from the laser light source unit in association with illumination of the laser emitting elements.

5. The projector as set forth in claim 1, wherein the control of the illumination by the light source control unit includes control of a time of turning on plural different types of the laser emitting elements simultaneously.

6. The projector according to claim 1, wherein the housing of the projector comprises a front side panel, a back side panel, two lateral side panels, a top panel, and a bottom panel; and wherein the projection side optical system guides the projection light to the front side panel, such that the projector emits light from the front side panel.

7. The projector according to claim 6, further comprising a cooling unit provided between the light source unit and one of the lateral side panels.

8. The projector according to claim 7, further comprising a cooling fan provided between the cooling unit and the back side panel.

* * * * *

UNITED STATES PATENT AND TRADEMARK OFFICE
CERTIFICATE OF CORRECTION

| | | |
|---|---|---|
| PATENT NO. | : 9,316,897 B2 | Page 1 of 1 |
| APPLICATION NO. | : 13/312312 | |
| DATED | : April 19, 2016 | |
| INVENTOR(S) | : Hiroki Masuda | |

It is certified that error appears in the above-identified patent and that said Letters Patent is hereby corrected as shown below:

In the Claims

Column 14, line 48, change "Noes" to --types--.

Column 14, line 50, change "orojector" to --projector--.

Signed and Sealed this
Second Day of August, 2016

Michelle K. Lee
*Director of the United States Patent and Trademark Office*